No. 747,386. PATENTED DEC. 22, 1903.
E. W. DIETZ & H. W. SPALDING.
MOLD FOR BUILDING BLOCKS.
APPLICATION FILED SEPT. 14, 1903.
NO MODEL. 2 SHEETS—SHEET 1.

Witnesses
C. E. Hunt
O. T. Wilson

Inventors
Edwin W. Dietz
Henry W. Spalding
By H. B. Wilson
Attorney

THE NORRIS PETERS CO., PHOTO-LITHO., WASHINGTON, D. C.

No. 747,386. PATENTED DEC. 22, 1903.
E. W. DIETZ & H. W. SPALDING.
MOLD FOR BUILDING BLOCKS.
APPLICATION FILED SEPT. 14, 1903.
NO MODEL. 2 SHEETS—SHEET 2.
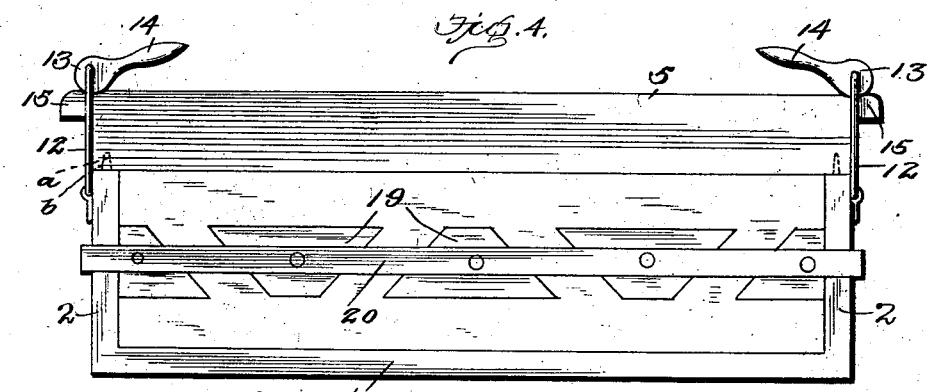
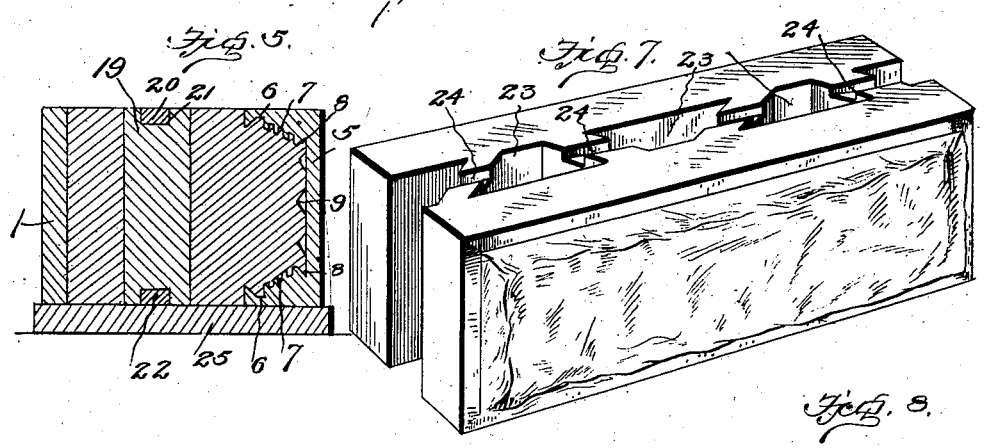
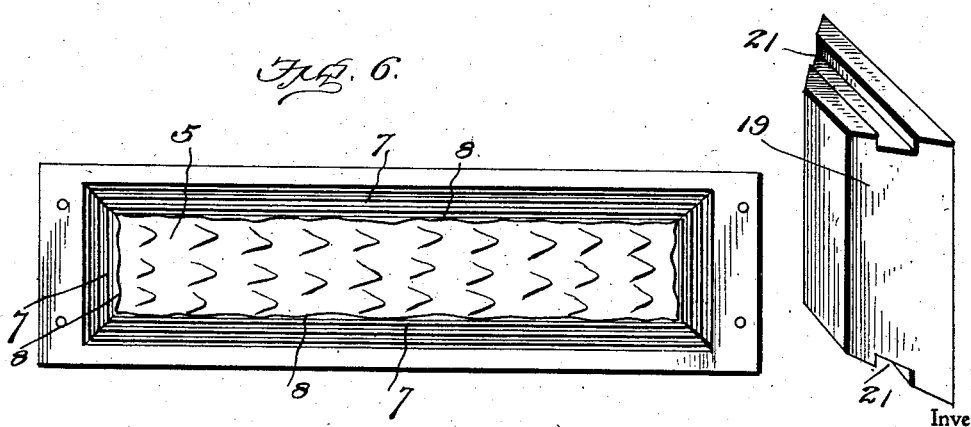
Witnesses
Inventors
Edwin W. Dietz
Henry W. Spalding
By
Attorney No. 747,386. Patented December 22, 1903.

UNITED STATES PATENT OFFICE.

EDWIN W. DIETZ AND HENRY W. SPALDING, OF AKRON, OHIO.

MOLD FOR BUILDING-BLOCKS.

SPECIFICATION forming part of Letters Patent No. 747,386, dated December 22, 1903.

Application filed September 14, 1903. Serial No. 173,169. (No model.)

*To all whom it may concern:*

Be it known that we, EDWIN W. DIETZ and HENRY W. SPALDING, citizens of the United States, residing at Akron, in the county of Summit and State of Ohio, have invented certain new and useful Improvements in Molds for Building-Blocks; and we do declare the following to be a full, clear, and exact description of the invention, such as will enable others skilled in the art to which it appertains to make and use the same.

This invention relates to a mold for building-blocks and the like.

The object of the invention is to provide a mold for forming building-blocks of hollow construction or which have openings and channels formed through the same to facilitate the circulation of air and prevent the penetration of moisture.

Another object is to provide a mold by which a "rock" surface may be given to the face of the block.

A further object is to provide a mold of this character which will be simple, strong, and durable, the parts of which may be easily and quickly put together and easily removed from the finished block.

With these and other objects in view the invention consists of certain novel features of construction, combination, and arrangement of parts, as will be more fully described, and particularly pointed out in the appended claims.

Figure 1:
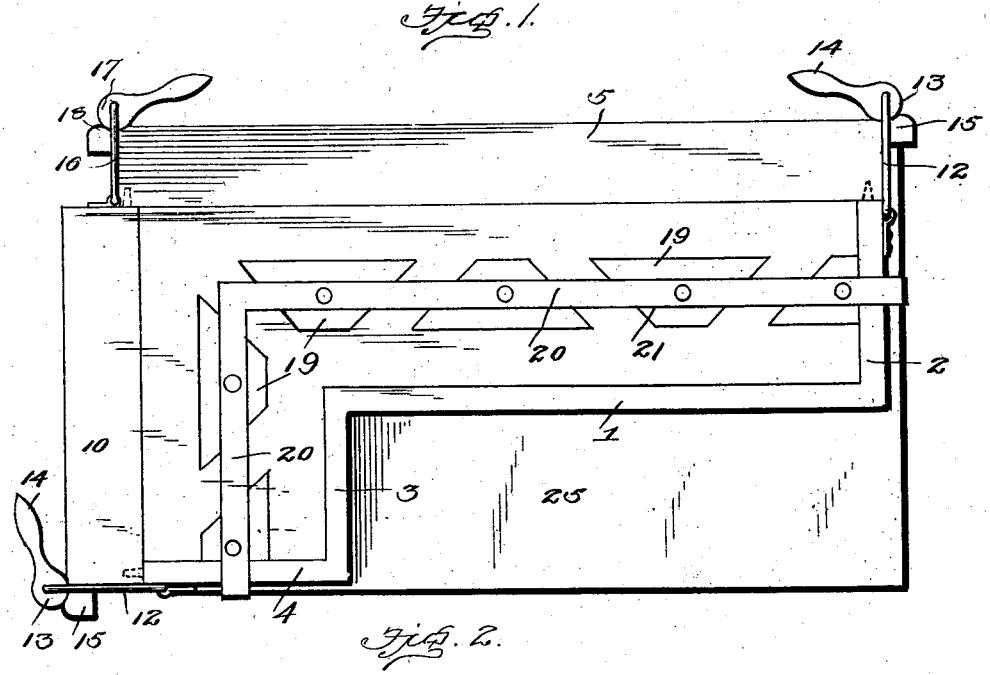
Figure 2:
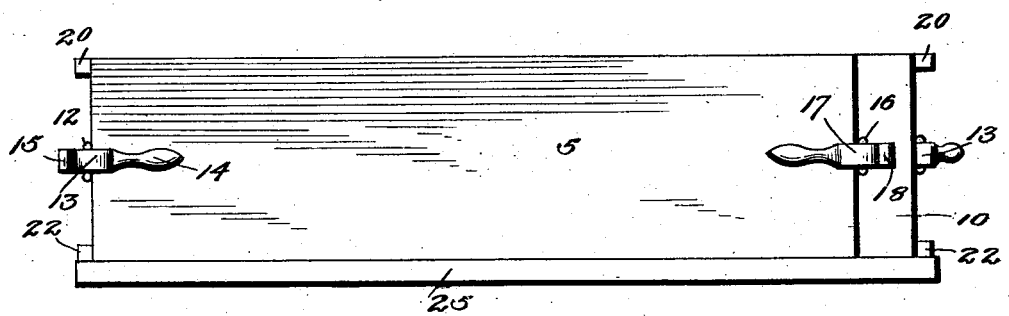
Figure 3:
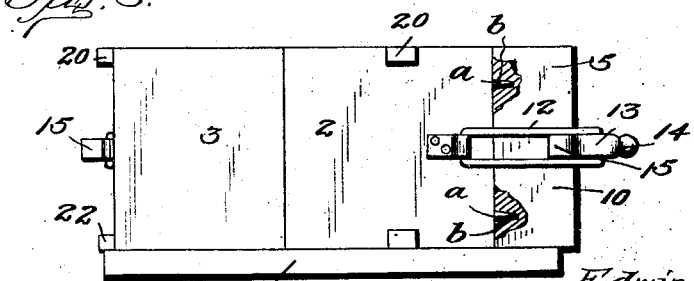

In the accompanying drawings, Figure 1 is a top plan view of the mold, showing the construction of the same used in forming a corner-block and showing a block in place in the mold. Fig. 2 is a side view thereof. Fig. 3 is an end view of the same. Fig. 4 is a top plan view of the form of mold used in forming a straight block. Fig. 5 is a vertical cross-sectional view through the mold and block shown in Fig. 4. Fig. 6 is an inside view of the front plate of the mold which forms the rock face. Fig. 7 is a perspective view of a finished block, and Fig. 8 is a detail perspective view of one of the core-blocks.

Referring more particularly to Figs. 1, 2, and 3 of the drawings, which show the form of mold used for the L-shaped or corner-blocks, 1 denotes the back piece, one end of which is formed with a right-angular extension 2 for forming the inner end of the block. The opposite end of the back piece is provided with a right-angular extension 3, which projects in a reverse direction to the end piece 2 and forms the back side of the L or corner of the block. The extension 3 is formed at its end with a right-angular-disposed piece 4, which forms the end of the L or corner piece of the block. 5 denotes a front piece of the mold, the same being in the shape of a rectangular box, the inner sides of which are provided with a channel 6, Fig. 5, extending around the same near the edge thereof, and from said channel the inner sides incline inwardly and are formed with a series of longitudinally-disposed grooves 7. Where said inclined sides join the inner side of the front wall, they are cut away in an irregular manner, as shown at 8. The inner side of the front plate is roughened and has formed therein a number of barbs 9. 10 denotes the end plate, which forms the outer face of the corner-block and is formed on its inner side in the same manner as the front piece. The front and end pieces have their inner sides constructed as described to form the rock surface on the block. The edges of the sides of the front and end piece form the flat or finished border on the face of the block around the "rock-finished" center. This "rock finish" is obtained by a portion of the cement entering the channel-grooves 6 and 7, causing a portion of the same to adhere thereto and to be broken away from the central portion of the face of the block when the front or end pieces are removed, thus giving the front of the block a broken or rough appearance simulating the raw rough surface of stone. The pieces forming the sides and ends of the mold may be connected together in any suitable manner, but are here shown as connected by means of bails 12, pivotally connected to the ends of the pieces 2 and 4, said bails carrying at their outer ends cams 13, having handles 14. The bails 12 are adapted to hook over lugs or pins 15, projecting from the ends of the front and end pieces, as shown, and when the cams are operated to bear against said lugs the parts will be drawn tightly together. To the end of the end piece 10, which engages the front piece, is pivotally connected a bail 16, carrying a cam 17, the same being adapted to engage a lug 18 on the adjacent end of the front piece, whereby the front and end plates are securely locked together. The edges of the end pieces of the mold are formed with pins *a*, which are adapted to enter sockets *b* in the meeting faces of the front and corner forming plates, thereby insuring a correct assembling of the parts and preventing the same from slipping. 19 denotes a series of frusto-triangular-shaped blocks spaced apart and connected together by means of a right-angular-shaped bar 20, which is countersunk or has a flush connection with the ends of said blocks by being let into slots or channels 21, formed in the ends of the same. A right-angularly-shaped bar 22, similar to the bar 20, is arranged beneath the mold and is loosely engaged by the slots or channels 21, formed in the lower ends of the blocks 19. The blocks 19 are arranged on the bar 20 in such manner that their vertex and base sides or faces will alternate, thereby forming between said blocks oppositely-projecting diagonally-arranged spaces. The blocks when so arranged form a core around which the material forming the block is placed and which when removed leaves a hollow space divided into cells 23 by the diagonally-arranged partitions formed by the spaces between the inclined edges of the core-blocks. Longitudinally-disposed channels 24 are also formed in the top and bottom of the block by means of the bars 20 and 22, which connect the core-blocks. 25 denotes a bottom plate or board, on which the mold is arranged, the bar 22 being preferably secured to the face of the board or plate 25 in position to receive the lower channeled ends of the core-blocks 19 when the core is placed in position in the mold.

In Figs. 4 and 5 is shown the construction of mold used in forming straight blocks. This construction is the same as is used for corner-blocks except that the end L-forming back piece 3 and the end of corner-piece 10 are not used. End pieces 2 are fixed on each end of the back piece 1, and to said end pieces the front piece 5 of the mold is connected. In this form of mold the bars 20 and 22 are straight, the core-blocks being arranged to leave a half-block at each end of the mold, thus forming but half-cells on the ends of the blocks, which when laid up will form complete cells with the next adjoining block, as will be readily understood.

In forming a block the front and rear sides and the ends of the mold are arranged in place on the base-board and locked together. The core, with the bar 26, is now inserted in the same upon the bar 22. A mixture of damp sand and cement or other plastic material is now placed in the mold and tramped solid until full. The material is now "struck off" even and smooth on the top and bottom sides. The core is now carefully removed and the clamping-bails opened The face-plates of the mold are then pulled off, leaving a rock finished to the exposed faces of the block. The end and rear pieces of the mold are now removed and the block allowed to stand and dry. The rock finished on the face of the block is formed by some of the material entering the channels and grooves 6 and 7 on the inner side of the face-plates and also sticking to the barbs formed thereon, so that when said plates are removed part of the material will remain in the plates breaking away from the face of the block and leaving a rough unfinished rock appearance, which will differ in formation on each stone, giving an effect strongly simulating a natural stone finish, which is a desirable feature in the construction of buildings from blocks of artificial stone.

The peculiar construction of the air cells and passages in each block formed by the core-block and their connecting-bars permits a general circulation of air through the walls, causing them to quickly dry out. The diagonally-arranged partitions between the air-cells lessen the possibility of moisture or frost penetrating by suction from one wall to the other of the block, as there is no right-angular communication or contact between the same. The longitudinal channel formed on the top and bottom of the blocks by the connecting-bars of the core-blocks are provided to break the contact of the mortar on the front and rear walls of the blocks when the same are laid up, thus preventing moisture from penetrating through the mortar between the blocks.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim, and desire to secure by Letters Patent, is—

1. A mold for building-blocks, having a core consisting of a series of frusto triangular-shaped blocks supported by longitudinally-disposed channel-forming bars, arranged at the upper and lower ends of the blocks, said blocks being spaced apart and fixed to one of said bars in such a manner that their base and vertex sides will be alternately arranged thereby forming diagonally-disposed oppositely-projecting spaces between the same, substantially as and for the purpose described.

2. A mold for building-blocks, having front and rear side and end plates, certain of which are in the shape of rectangular boxes, the inner portion of the sides of which are inclined inwardly and provided with longitudinally-disposed channels and grooves, the inner face of the front piece thereof being provided with barbs, and a core adapted to be inserted in said mold, said core consisting of a series of frusto triangular-shaped blocks, supported by longitudinally-disposed channel-forming bars arranged at the upper and lower ends of the blocks, said blocks being spaced apart and fixed to one of said bars in such a manner that their base and vertex sides will be alternately arranged thereby forming diagonally-disposed oppositely-projecting spaces between the same, substantially as and for the purpose described.

In testimony whereof we have hereunto set our hands in presence of two subscribing witnesses.

EDWIN W. DIETZ.
HENRY W. SPALDING.

Witnesses:
ALBERT G. MEMMER,
CHARLIE A. HINE.